(12) United States Patent
Arbel et al.

(10) Patent No.: US 12,474,866 B2
(45) Date of Patent: Nov. 18, 2025

(54) INTERCONNECT CIRCUITRY FOR MULTI-CHANNEL AND MULTI-REQUESTER MEMORY SYSTEMS

(71) Applicant: XILINX, INC., San Jose, CA (US)

(72) Inventors: Ygal Arbel, Morgan Hill, CA (US); Krishnan Srinivasan, San Jose, CA (US)

(73) Assignee: XILINX, INC., San Jose, CA (US)

(*) Notice: Subject to any disclaimer, the term of this patent is extended or adjusted under 35 U.S.C. 154(b) by 47 days.

(21) Appl. No.: 18/241,142

(22) Filed: Aug. 31, 2023

(65) Prior Publication Data

US 2025/0077116 A1   Mar. 6, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
None
See application file for complete search history.

(56) References Cited

U.S. PATENT DOCUMENTS 5,041,971 A * 8/1991 Carvey ............. G06F 15/17393
                                                    370/388
9,985,912 B1 * 5/2018 Wagh ..................... H04L 49/555

2016/0170916 A1 * 6/2016 Deshpande ......... G06F 13/1684
                                                      710/317
2017/0185342 A1 * 6/2017 Cho ....................... G06F 3/0683
2018/0267846 A1 * 9/2018 Dobbs .................. G06F 11/3419

OTHER PUBLICATIONS

International Search Report and Written Opinion for PCT/US2024/033336 dated Sep. 27, 2024.

* cited by examiner

*Primary Examiner* — Arpan P. Savla
*Assistant Examiner* — Edmund H Kwong
(74) *Attorney, Agent, or Firm* — Patterson + Sheridan, LLP (57) ABSTRACT

An integrated circuit device includes interconnect circuitry. The interconnect circuitry includes interleaving switch circuitries, network switch circuitries, and crossbar circuitries. The interleaving switch circuitries are coupled to requester devices. A first interleaving switch circuitry includes first ports. The first interleaving switch circuitry receives a first memory command, and outputs the first memory command via first communication lanes connected to a first port based on a memory address of the first memory command. The network switch circuitries are connected to the interleaving switch circuitries. A first network switch circuitry is connected to the first communication lanes and route the first memory command along the first communication lanes based on the memory address. A first crossbar circuitry of the crossbar circuitries receives the first memory command from the first communication lanes, and outputs the first memory command to a first memory device of the memory devices associated with the memory.

20 Claims, 5 Drawing Sheets

INTERCONNECT CIRCUITRY FOR MULTI-CHANNEL AND MULTI-REQUESTER MEMORY SYSTEMS

TECHNICAL FIELD

Examples of the present disclosure generally relate to interconnect circuitry for an integrated circuit device that connects requester circuit elements with memory channels of a memory device in an at least partially non-blocking manner.

BACKGROUND

Integrated circuit (IC) devices include memory subsystem circuitries that control access to a memory device or memory devices. An IC device includes multiple requester elements. A requester element is a circuit element within an IC device that outputs memory commands (e.g., memory read commands and memory write commands) to the memory devices to read and write data to the memory devices. A memory subsystem circuitry includes interconnect circuitry and memory channels that connect the circuit elements of the IC device with the memory devices, providing the circuit elements access to the memory devices. The interconnect circuitry is configured such that access provided to one circuit element does not block the access provided to another circuit element. To provide non-block access, the interconnect circuitry includes multiple crossbar circuitries. Each crossbar circuitry has multiple ingress ports and multiple egress ports. The number of ingress ports and the number of egress ports increase based on the number of requesters and the number of memory channels. However, to support high speed memory devices having an increased number of channels, the number of and/or size of crossbar circuitries is increased, increasing the circuit area and power requirements of the corresponding IC device, which increases the manufacturing cost of the IC device. Thus, there is a need for an improved interconnect circuitry that is able to support high speed memory devices while with reduced amount circuit area and/or power requirements.

SUMMARY

In one example, an interconnect circuitry includes interleaving switch circuitries, network switch circuitries, and crossbar circuitries. The interleaving switch circuitries are coupled to requester devices. A first interleaving switch circuitry of the interleaving switch circuitries includes first ports. The first interleaving switch circuitry receives a first memory command, and outputs the first memory command via first communication lanes connected to a first port of the first ports based on a memory address of the first memory command. The network switch circuitries are connected to the interleaving switch circuitries. A first network switch circuitry of the network switch circuitries is connected to the first communication lanes and routes the first memory command along the first communication lanes based on the memory address. The crossbar circuitries are coupled to memory devices. A first crossbar circuitry of the crossbar circuitries receives the first memory command from the first communication lanes, and outputs the first memory command to a first memory device of the memory devices associated with the memory address.

In one example, an integrated circuit (IC) device includes a requester circuit element and interconnect circuitry. The requester circuit element outputs a first memory command. The interconnect circuitry is connected to the requester circuit element. The interconnect circuitry includes interleaving switch circuitries, network switch circuitries, and crossbar circuitries. A first interleaving switch circuitry of the interleaving switch circuitries receives the first memory command, and outputs the first memory command via first communication lanes connected to a first port based on a memory address of the first memory command. The network switch circuitries are connected to the interleaving switch circuitries. A first network switch circuitry of the network switch circuitries is connected to the first communication lanes and routes the first memory command along the first communication lanes based on the memory address. The crossbar circuitries are coupled to memory devices. A first crossbar circuitry of the crossbar circuitries receives the first memory command from the first communication lanes and outputs the first memory command to a first memory device of the memory devices associated with the memory address.

In one example, a method includes receiving a first memory command at a first interleaving switch circuitry of interleaving switch circuitries of interconnect circuitry. Further, the method includes outputting, via a first port of the first interleaving switch circuitry, the first memory command via first communication lanes of the interconnect circuitry based on a memory address of the first memory command. The method further includes routing, via a first network switch circuitry of network switch circuitries of the interconnect circuitry, the first memory command along the first communication lanes based on the memory address. The first network switch circuitry is connected to the first communication lanes. Further, the method includes outputting, via a first crossbar circuitry of crossbar circuitries of the interconnect circuitry, the first memory command to a first memory device of memory devices associated with the memory address. The first crossbar circuitry connected to the first communication lanes.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Integrated circuit (IC) devices use memory commands to interact with memory devices. The memory devices may be external to and connected to a corresponding IC device. In one or more examples, an IC device includes a memory subsystem circuitry that connects circuit elements within the IC device with the memory devices via memory channels. Memory subsystem circuitry includes interface circuitry that includes crossbar circuitries that are vertically and horizontally connected to the circuit elements. The vertical and horizontal connections include network switch circuitries that allow for each of the circuit elements to communicate memory commands to each of the memory devices. The circuit elements may be referred to as requester circuit elements. In one example, the number of requester circuit elements is 48. In another example, the number of requester circuit elements is greater than or less than 48.

In one or more examples, the memory devices are High Bandwidth Memory (HBM) devices. Further, a memory device may include a stack of memory chips. In such an example, a memory device includes multiple memory chips horizontally and/or vertically connected with each other. A memory device includes multiple memory channels that are used to connect the memory device with the memory subsystem circuitry of the IC device. The number of memory channels is 32. In other examples, the number of memory channels is greater than or less than 32.

A memory subsystem provides a communication path from each requester circuit element to each memory channel of each memory device. The memory subsystem circuitry is configured such that each requester circuit element is provided concurrent non-blocking connectivity from any request circuit element to any memory channel of the memory devices. In a non-blocking connectivity, a connection from one circuit element to a memory channel does not interfere with a connection from another circuit element to another memory channel. In one example, a crossbar circuitry having a number of ingress ports at least equal to the number of requester circuit elements and a number of egress ports at least equal to the number of memory channels may be used. However, in such an example the circuit area size of the crossbar circuitry is cost and power performance prohibitive. To reduce the circuit area associated with the crossbar circuitry, the crossbar circuitry is divided into multiple smaller crossbar circuitries. However, due to the large number of requester circuit elements and memory channels, the circuit area of the smaller crossbar circuitries is cost and power performance prohibitive, much like the circuit area of a single crossbar circuitry. In one example, the interconnect circuitry of memory system circuitry is a network-on-chip (NoC) that has multiple communication lanes (NoC channels) that provide traffic (e.g., memory command communications) to travel between each requester circuit element and each memory channel. The communication lanes include horizontal and vertical communication lanes to connect the requester circuit elements with the memory channels. In one example, each crossbar circuitry is connected to eight vertical communication lanes. However, the performance of such an interconnect circuitry is limited by the bandwidth of the horizontal communication lanes.

As is described herein, an IC device includes memory system circuitry having interconnect circuitry that includes interleaving switch circuitries, network switches, and crossbar circuitries. The interleaving switch circuitries, the network switches, and crossbar circuitries partition the interconnect circuitry into multiple communication lanes (e.g., vertical and horizontal communication lanes) that allow traffic (e.g., memory command communications) to travel between each requester circuit element and each memory channel. The interleaving switch circuitries correspond to the interleaving within the corresponding memory devices. The interleaving switch circuitries direct received memory commands to the network switch circuitries and the crossbar circuitries based on the relationship between the corresponding memory address and the interleaving of the memory devices. Further, data may be routed back to the interleaving switch circuitries from the memory devices via the crossbar circuitries and the network switch circuitries. The interconnect circuitry as described herein has a reduced circuit area and increased performance as compared to interconnect circuitries having other configurations. Accordingly, IC devices including the interconnect circuitry as described herein have a reduced semiconductor manufacturing cost and improved performance.

Figure 1:
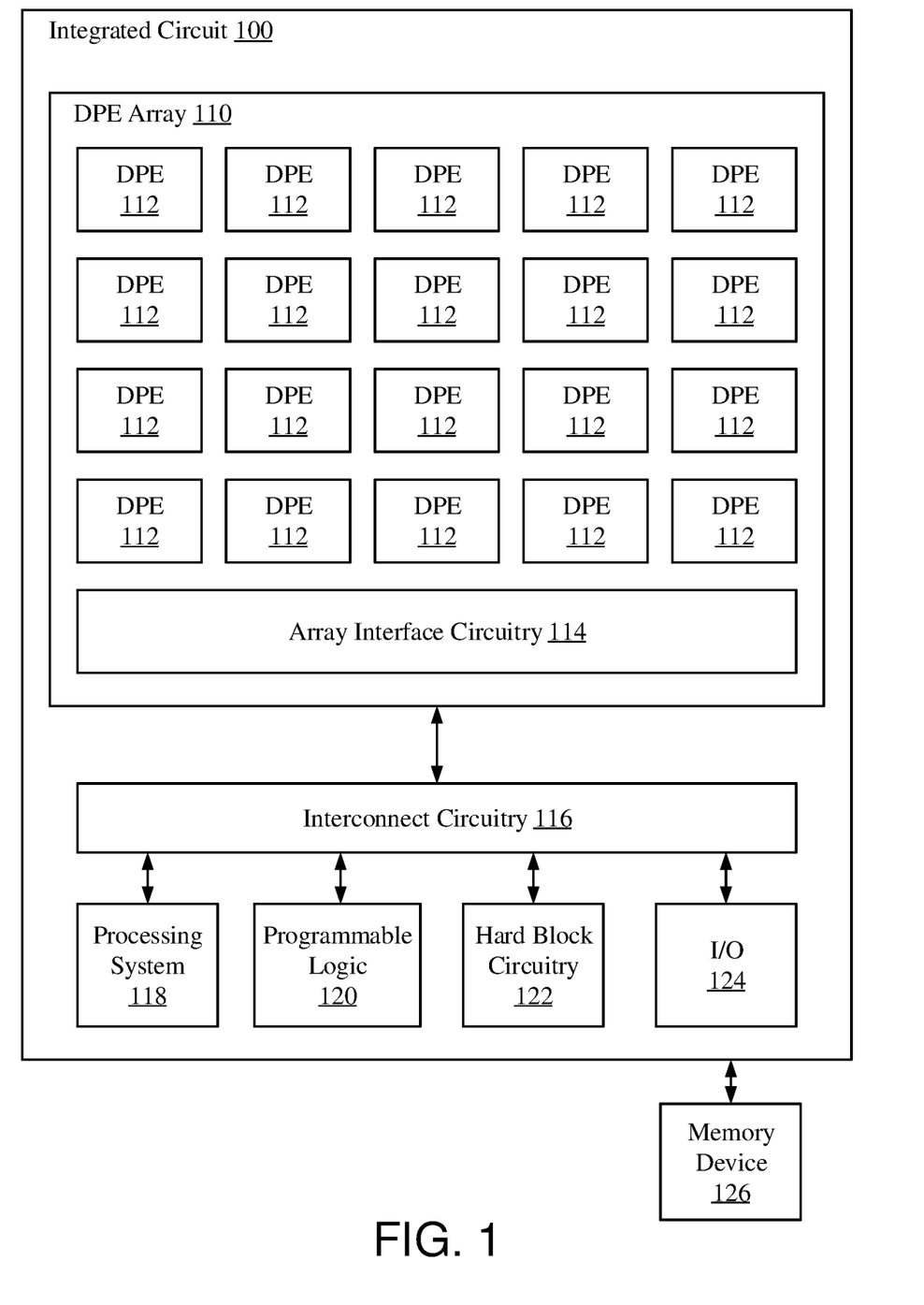
FIG. 1 illustrates a block diagram of an integrated circuit device.

FIG. 1 illustrates a block diagram of an IC device 100, according to one or more examples. In one example, the IC device 100 includes an IC chip. In another example, the IC device 100 includes two or more IC chips that are interconnected with each other. In one or more examples, the IC device 100 is a field programmable gate array (FPGA). In other examples, the IC device 100 is implemented using any of a variety of different types of IC architectures. The IC device 100 may be a System-on-Chip (SoC). The IC device 100 includes a plurality of subsystems, including a digital processing engine (DPE) array 110, a processing system (PS) 118, programmable logic (PL) circuitry 120, hard block circuitries (HB) 122, input/output circuits (I/O) 124, and interconnect circuitry 116. In some examples, each subsystem includes at least some component or circuit that is programmable, such as described herein. In some examples, some of the sub-systems can include a non-programmable application-specific circuit. Other circuits can be included in the IC device 100, such as other IP blocks like a system monitor or others.

The DPE array 110 includes a plurality of interconnected DPEs 112. Each of the DPEs 112 is a hardwired circuit block and may be programmable. Each of the DPEs 112 includes a core, memory module, and interconnect circuitry, among other circuit elements. In other examples, the DPEs 112 may have different configurations. In the example of FIG. 1, the DPE array 110 includes a two-dimensional array of DPEs 112 and array interface circuitry 114. The DPE array 110 includes one or more DPEs 112. The DPEs 112 are arranged in aligned rows and aligned columns. However, other arrangements of DPEs 112 may be implemented. In some examples, the DPEs 112 may be arranged where DPEs 112 in selected rows and/or columns are horizontally inverted or flipped relative to DPEs 112 in adjacent rows and/or columns. In other examples, rows and/or columns of DPEs 112 may be offset relative to adjacent rows and/or columns.

The DPEs 112 can various data by different mechanisms within the DPE array 110. The DPEs 112 are connected to form a DPE interconnect network. To form the DPE interconnect network, each DPE 112 is connected to vertically neighboring DPE(s) 112 and horizontally neighboring DPE(s) 112, or other adjacent DPEs. The DPE interconnect network includes a stream network and a memory mapped network. The stream network includes interconnected stream switches, and application data and direct memory accesses (DMAs) may be communicated between the DPEs 112 via the stream network. The memory mapped network includes interconnected memory mapped switches, and configuration and control data can be communicated between the DPEs 112 via the memory mapped network. Neighboring DPEs 112 can further communicate via shared memory. An independent cascade stream can be implemented between DPEs 112.

The DPE array 110 further includes the array interface circuitry 114 that includes tiles. Each of the tiles of the array interface circuitry 114 may be hardwired and programmable. Each of the tiles can include the architecture as illustrated in and described below with respect to FIG. 3. The array interface circuitry 114 provides an interface between DPEs 112 of the DPE array 110 and other subsystems of the IC device 100, such as the interconnect circuitry 116 and the PL circuitry 120.

In some examples, the array interface circuitry 114 is coupled to adjacent DPEs 112. For example, as illustrated in FIG. 1, the array interface circuitry 114 may be connected to each DPE 112 in a bottom row (e.g., a row closest to the array interface circuitry 114) of DPEs 112 in the DPE array 110. The array interface circuitry 114 provides communication between the DPE array 110 and the interconnect circuitry 116.

The processing system 118 may be or include any of a variety of different processor types and number of processor cores. For example, the processing system 118 may be implemented as an individual processor, e.g., a single core capable of executing program instruction code. In another example, the processing system 118 may be implemented as a multi-core processor. The processing system 118 may be implemented using any of a variety of different types of architectures. Example architectures that may be used to implement the processing system 118 may include an ARM processor architecture, an x86 processor architecture, a graphics processing unit (GPU) architecture, a mobile processor architecture, a digital signal processor (DSP) architecture, or other suitable architecture that is capable of executing computer-readable program instruction code.

The programmable logic circuitry 120 is logic circuitry that may be programmed to perform specified functions. As an example, the programmable logic circuitry 120 may be implemented as fabric of an FPGA. The programmable logic circuitry 120 can include programmable logic elements including configurable logic blocks (CLBs), look-up tables (LUTs), random access memory blocks (BRAM), Ultra RAMs (URAMs), input/output blocks (IOBs), digital signal processing blocks (DSPs), clock managers, and/or delay lock loops (DLLs). In some architectures, the programmable logic circuitry 120 includes columns of programmable logic elements, where each column includes a single type of programmable logic element (e.g., a column of CLBs, a column of BRAMs, etc.). The programmable logic elements can have one or more associated programmable interconnect elements. For example, in some architectures, the programmable logic circuitry 120 includes a column of programmable interconnect elements associated with and neighboring each column of programmable logic elements. In such examples, each programmable interconnect element is connected to an associated programmable logic element in a neighboring column and is connected to neighboring programmable interconnect elements within the same column. The interconnected columns of programmable interconnect elements can form a global routing network within the programmable logic circuitry 120.

The programmable logic circuitry 120 has an associated configuration frame interconnect (CF). A configuration frame node residing on a platform management controller (PMC) of the processing system 118 is connected to the CF. The PMC sends configuration data to the configuration frame node, and the configuration frame node formats the configuration data in frames and transmits the frames through the CF to the programmable logic elements and programmable interconnect elements. The configuration data may then be loaded into internal configuration memory cells of the programmable logic elements and programmable interconnect elements that define how the programmable elements are configured and operate. Any number of different sections or regions of programmable logic circuitry 120 may be implemented in the IC device 100.

The hard block circuitry 122 can be or include one or more memory controllers (such as double data rate (DDR) memory controllers, one or more high bandwidth memory (HBM) memory controllers, or the like), peripheral component interconnect express (PCIe) blocks, Ethernet cores (such as a 100 Gbps (C=100) media address controller (CMAC), a multi-rate MAC (MRMAC), or the like), forward error correction (FEC) blocks, Analog-to-Digital Converters (ADC), Digital-to-Analog Converters (DAC), and/or any other hardened circuit. The I/O 124 can be implemented as eXtreme Performance Input/Output (XPIO), multi-gigabit transceivers (MGTs), or any other input/output blocks. Any of the hard block circuitry 122 and/or I/O 124 can be programmable.

The interconnect circuitry 116 includes a programmable network and a peripheral interconnect. In one example, the interconnect circuitry 116 is a Network-on-Chip (NoC). The programmable network communicatively couples subsystems and any other circuits of the IC device 100 together. The programmable network includes packet switches and interconnect lines connecting the packet switches. Each packet switch performs switching of packets in the programmable network. The programmable network has interface circuits at the edges of the programmable network.

In an example wherein the interconnect circuitry 116 is a NoC, the interface circuits include NoC master units (NMUs) and NoC slave units (NSUs). Each NMU is an ingress circuit that connects a master circuit to the programmable network, and each NSU is an egress circuit that connects the programmable network to a slave endpoint circuit. NMUs are communicatively coupled to NSUs via the NoC packet switches and interconnect lines of the programmable network. The NoC packet switches are connected to each other and to the NMUs and NSUs through the interconnect lines to implement a plurality of physical channels in the programmable network. The NoC packet switches, NMUs, and NSUs include register blocks that determine the operation of the respective NoC packet switch, NMU, or NSU.

The interconnect circuitry 116 includes one or more physical channel. A physical channel can also have one or more virtual channels. The virtual channels can implement weights to prioritize various communications along any physical channel. The NoC packet switches also support multiple virtual channels per physical channel. The programmable network includes end-to-end Quality-of-Service (QOS) features for controlling data-flows therein. In examples, the programmable network first separates data-flows into designated traffic classes. Data-flows in the same traffic class can either share or have independent virtual or physical transmission paths. The QoS scheme applies multiple levels of priority across traffic classes. Within and across traffic classes, the programmable network applies a weighted arbitration scheme to shape the traffic flows and provide bandwidth and latency that meets the user requirements.

The peripheral interconnect includes circuitry to write to register blocks that determine the functionality of the NMUs, NSUs, and NoC packet switches. The peripheral interconnect includes a peripheral interconnect coupled to the register blocks for programming thereof to set functionality. The register blocks in the NMUs, NSUs, and NoC packet switches of the programmable network support interrupts, QoS, error handling and reporting, transaction control, power management, and address mapping control. The peripheral interconnect includes a peripheral interconnect root node residing on the processing system 118, interconnected peripheral interconnect switches connected to the peripheral interconnect root node, and protocol blocks connected to the interconnected peripheral interconnect switches and a corresponding register block.

To write to register blocks, a master circuit, such as processing system 118, sends configuration data to the peripheral interconnect root node, and the peripheral interconnect root node packetizes the configuration data into a memory-mapped write request in a format implemented by the peripheral interconnect. The peripheral interconnect transmits the memory-mapped write request to interconnected peripheral interconnect switches, which route the request to a protocol block connected to the register block to which the request is directed. The protocol block can then translate the memory-mapped transaction write request into a format implemented by the register block and transmit the translated request to the register block for writing the configuration data to the register block. The peripheral interconnect may be used to program any programmable boundary circuit of the IC device 100. For example, the peripheral interconnect may be used to program any hard block circuitry 122 and/or I/O 124 that is programmable.

Various subsystems and circuits of the IC device 100 are communicatively coupled by various communication mechanisms. Some subsystems or circuits can be directly connected to others. As illustrated the I/O 124 is directly connected to the hard block circuitry 122 and programmable logic circuitry 120, and the hard block circuitry 122 is further directly connected to the programmable logic circuitry 120 and the processing system 118. The programmable logic circuitry 120 is directly connected to the DPE array 110. The DPE array 110, processing system 118, programmable logic circuitry 120, hard block circuitry 122, and I/O 124 are communicatively coupled together via the programmable network of the interconnect circuitry 116.

The DPEs 112 and the array interface circuitry 114 may be programmed by loading configuration data into configuration registers that define operations of the DPEs 112 and array interface circuitry 114, by loading program instruction code into program memory for execution by the DPEs 112, and/or by loading application data into memory banks of the DPEs 112. The processing system 118 can transmit configuration data, program instruction code, and/or application data via the programmable network from the interconnect circuitry 116 to the array interface circuitry 114. At each circuit element of the array interface circuitry 114 that receives configuration data, program instruction code, and/ or application data, the configuration data, program instruction code, and/or application data received from the programmable network is converted into a memory mapped transaction that is routed via the memory mapped network to a configuration register, program memory, and/or memory bank addressed by the memory mapped transaction (and hence, to a target DPE 112). The configuration data, program instruction code, and/or application data is written to the configuration register, program memory, and/or memory bank, respectively, by the memory mapped transaction.

Using a DPE array as described herein in combination with one or more other subsystems provides heterogeneous processing capabilities of the IC device 100. The So IC device 100 may have increased processing capabilities while keeping area usage and power consumption low. For example, the DPE array 110 may be used to hardware accelerate particular operations and/or to perform functions offloaded from one or more of the subsystems of the IC device 100. When used with a processing system 118, for example, the DPE array 110 may be used as a hardware accelerator. The processing system 118 may offload operations to be performed by the DPE array 110 or a portion thereof. In other examples, the DPE array 110 may be used to perform computationally resource intensive operations such as generating digital pre-distortion to be provided to analog/mixed signal circuitry.

In some examples, the IC device 100 can be communicatively coupled to other components. As illustrated, the IC device 100 is communicatively coupled to a memory device (e.g., double data rate dynamic RAM (DDRDRAM)). The memory device 126 includes one or more memory chips that are located, e.g., on a same board (e.g., evaluation board) as the IC device 100 or on a different board as the IC device 100. In one example, the memory device 126 includes a memory controller that receives data from the I/O 124. Further, the memory device 126 is a high bandwidth memory (HBM). The memory device 126 is communicatively coupled to the I/O 124, which is connected to hard block circuitry 122 (e.g., one or more memory controllers). The hard block circuitry 122 is connected to the processing system 118, which is capable of reading data from the memory device 126 via the hard block circuitry 122 and I/O 124, and writing the read data the memory device 126.

In one example, the memory device 126 includes memory channels that connect the memory device 126 to the IC device 100. In one example, the memory device 126 includes 32 memory channels. In other examples, the memory device 126 includes more or less than 32 channels. As is described in more detail in the following, the interconnect circuitry 116 includes interleaving switch circuitries, network switch circuitries, and crossbar circuits that route memory commands from requester circuit elements (e.g., the DPEs 112) to the memory device 126. As the use of interleaving switch circuitries, network switch circuitries, and crossbar circuits decreases the circuit area and power usage of the interconnect circuitry 116 as compared to other configurations, the semiconductor manufacturing cost of the IC device 100 is decreased while the performance the IC device 100 is increased.

Figure 2:
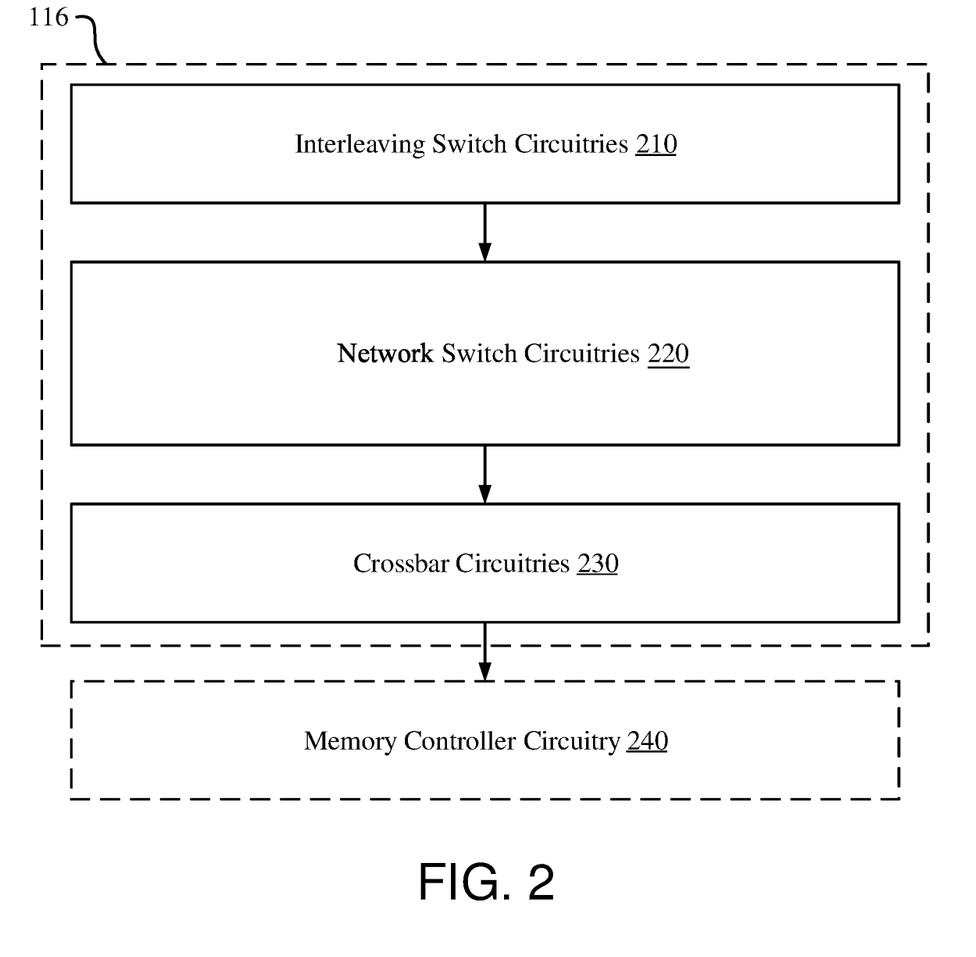
FIG. 2 illustrates a block diagram of interconnect circuitry.

FIG. 2 illustrates a block diagram of interconnect circuitry 116, according to one or more examples. As is illustrated in FIG. 2, the interconnect circuitry 116 includes interleaving switch circuitries 210, network switch circuitries 220, and crossbar circuitries 230. In one example, the interconnect circuitry 116 is connected to the memory controller circuitry 240. The memory controller circuitry 240 is implemented within the hard block circuitry 122 of FIG. 1.

The interleaving switch circuitries 210 includes one or more interleaving switch circuitries 210 that receive memory commands and route the memory commands based on an address within the memory commands. For example, the memory devices (e.g., the memory device 126 of FIG. 1) may be interleaved with each other. In such an example for a granule size of 256 bytes and a range of address modulus 1024, the memory devices are interleaved such that addresses 0-255 are associated with a first memory device, addresses 256-511 are associated with a second memory device, address 512-767 are associated with a third memory device, and addresses 768-1023 are associated with a fourth memory device. The pattern repeats for addresses greater than 1024. In other example, the granule size is greater than or less than 256 bytes. In one specific example, the granule size is 64 bytes. In interleaved memory devices, a memory command may span multiple different memory devices. For example, for a memory command that is associated with addresses 245-275, the memory command is associated with the first and second memory devices.

Each interleaved memory device is associated with different memory addresses based on the granule size and the number of interleaved memory devices. The addresses associated with each memory address are associated with communication lanes within the interconnect circuitry 116. Each of the interleaving switch circuitries 210 receives a memory command and outputs the memory command to one of the communication lanes based on the memory address of the memory command. Each of the interleaving switch circuitries 210 includes one or more ingress ports and one or more egress ports. The number of egress ports corresponds to the interleaving order. In one example, the interleaving order is four. In other examples, the interleaving order is more than or less than four. In one example, the interleaving order corresponds to the interleaving order of the memory device or devices. The number of ingress ports corresponds to a number of requester circuit elements connected to each of the interleaving switch circuitries 210.

The network switch circuitries 220 include two or more network switch circuitries, which are connected to the communication lanes and communicate memory commands horizontally and/or vertically along the communication lanes. In one example, each communication lane is associated with one or more network switch circuitries 220. Each network switch circuitries 220 includes two or more ports. In one or more examples, each of the network switch circuitries 220 includes three or four ports. The ports of a network switch circuitry 220 are bi-directional.

The crossbar circuitries 230 include two or more crossbar circuitries. Each crossbar circuitries 230 is connected to communication lanes associated with a respective memory device. For example, communication lanes associated with a first memory device is connected to a first crossbar circuitries 230, communication lanes associated with a second memory device are connected to a second crossbar circuitries 230, communication lanes associated with a third memory device are connected to a third crossbar circuitries 230, and communication lanes associated with a fourth memory device are connected to a fourth crossbar circuitries 230. In one example, each memory device is connected to communication lanes associated with multiple crossbar circuitries 230, and each crossbar circuitries 230 is connected to communication lanes associated with a single memory device. In such an example, communication lanes associated with a first memory device is connected to a first and second crossbar circuitries 230, communication lanes associated with a second memory device are connected to a third and fourth crossbar circuitries 230, communication lanes associated with a third memory device are connected to a fifth and sixth crossbar circuitries 230, and communication lanes associated with a seventh and eighth memory device are connected to a fourth crossbar circuitries 230. Examples of the connections between the communication lanes and crossbar circuitries 230 are illustrated in FIG. 3 and FIG. 4.

The crossbar circuitries 230 are connected to the memory controller circuitry 240. Each of the crossbar circuitries 230 is connected to the memory controller circuitry 240, and outputs memory commends to the memory controller circuitry 240. The memory controller circuitry 240 outputs the commands to the memory devices (e.g., the memory devices 126).

In one example, each interleaving switch circuitries 210 is connected to a NMU associated with a requester circuit element, and each crossbar circuitries 230 is connected to an NSU that is associated with the memory controller circuitry 240, and corresponding memory channels.

Figure 3:
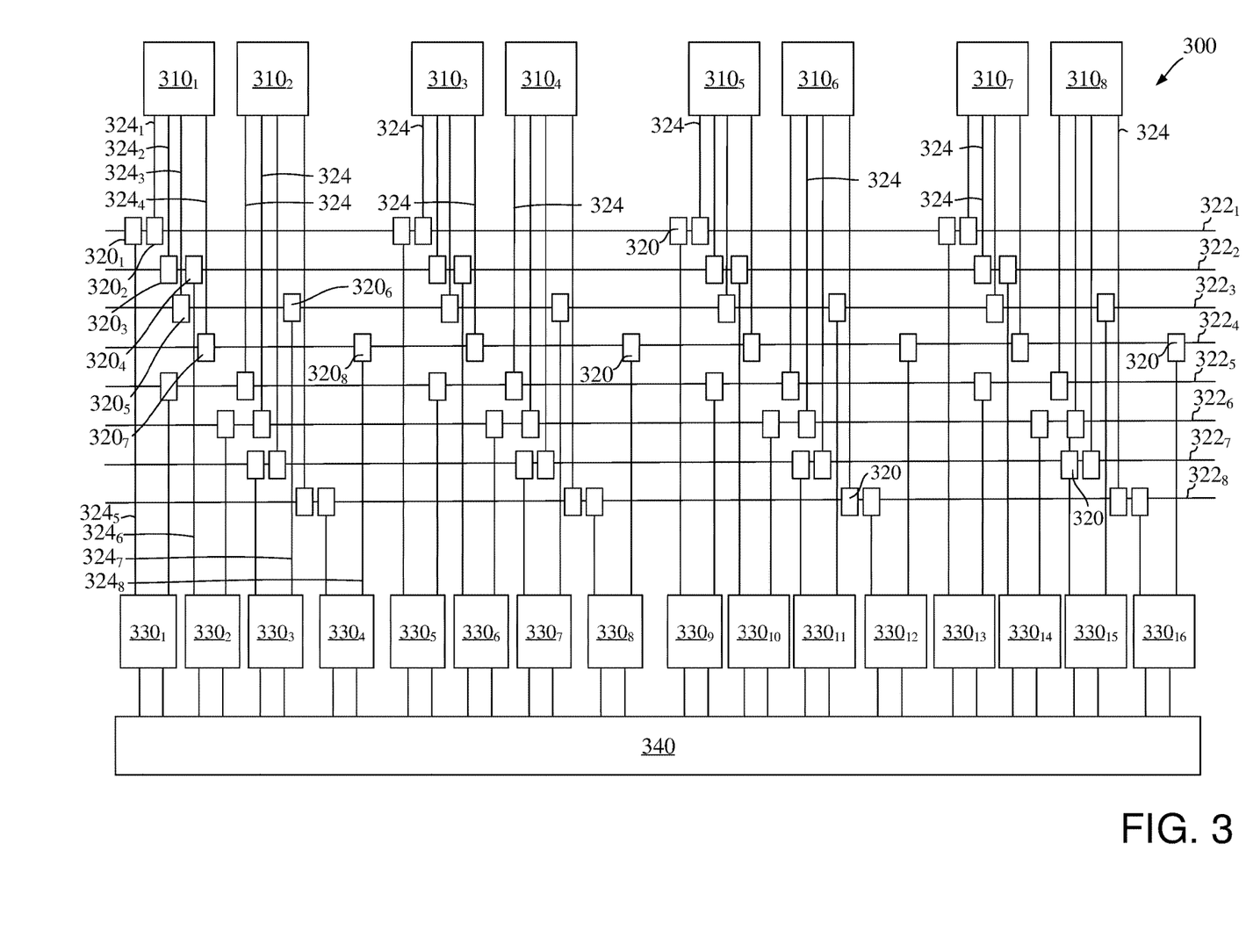
FIG. 3 illustrates a block diagram of interconnect circuitry.
Figure 4:
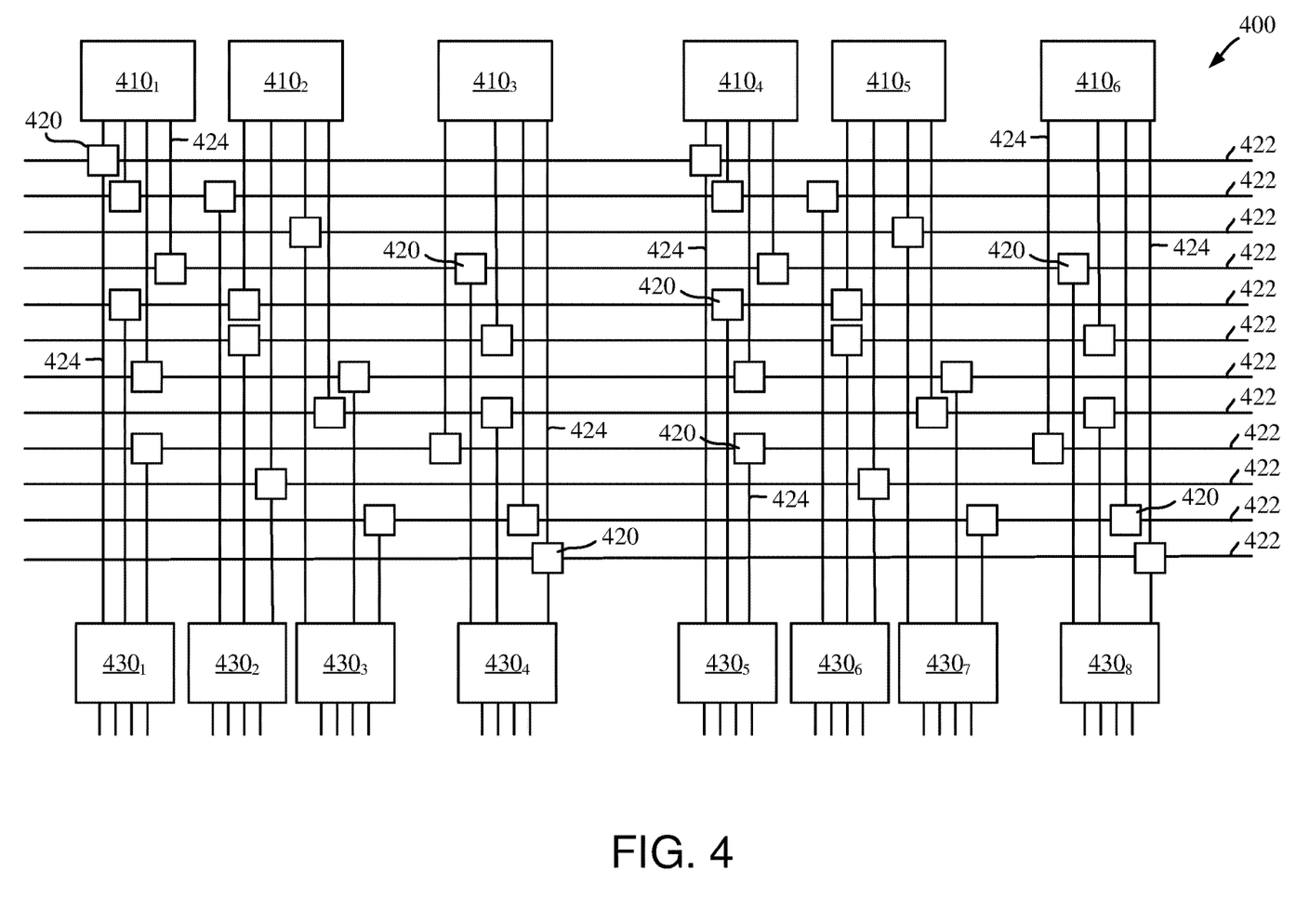
FIG. 4 illustrates a block diagram of interconnect circuitry.

FIG. 3 illustrates a block diagram of interconnect circuitry 300, according to one or more examples. The interconnect circuitry 300 includes interleaving switch circuitries 310, network switch circuitries 320, and crossbar circuitries 330. The interleaving switch circuitry 310 is configured similar to that of the interleaving switch circuitries 210 of FIG. 2, network switch circuitries 320 is configured similar to that of the network switch circuitries 220 of FIG. 2, and crossbar circuitries 330 are configured similar to that of crossbar circuitries 230 of FIG. 2. In one example, each interleaving switch circuitry 310 includes three ingress ports and four egress ports. In other examples, the number of input and egress ports may differ. Further, each crossbar circuitry 330 has two ingress ports and two egress ports. In other examples, the number of input and egress ports may differ. The network switch circuitries 320 include one or more ingress ports and one or more egress ports. In one example, different combinations of network switch circuitries 320 having different number of input and egress ports may be used.

Each of the interleaving switch circuitries 310 is connected to two or more vertical communication lanes 324. As is illustrated in the example of FIG. 3, each of the interleaving switch circuitries 310 is connected to four vertical communication lanes 324. A vertical communication lane 324 may include one or more wires. In one example, a vertical communication lane 324 is a channel.

The interleaving switch circuitries 310 are connected to the crossbar circuitries 330 via the vertical communication lanes 324, the horizontal communication lanes 322, and the network switch circuitries 320. A horizontal communication lane 322 may include one or more wires. In one example, a vertical communication lane 322 is a channel.

The network switch circuitries 320 interconnect the vertical communication lanes 324 and the horizontal communication lanes 322. Each horizontal communication lane 322 is connected to multiple crossbar circuitries 330 via network switch circuitries 320 and vertical communication lanes 324. The interconnections between each of the horizontal communication lanes 322 and the vertical communication lanes 324 using the network switch circuitries 320 form connections between the interleaving switch circuitries 310 and the crossbar circuitries 330. For example, each interleaving switch circuitry 310 is connected to each of the crossbar circuitries 330 via different combinations of the horizontal communication lanes 322 and the vertical communication lanes 324 using the network switch circuitries 320.

For example, an egress port of the interleaving switch circuitry $310_1$ is connected to the vertical communication lane $324_1$, which is connected the horizontal communication lane $322_1$ via the network switch circuitry $320_2$. Further, the vertical communication lane $324_1$ is connected to the vertical communication lane $324_5$ via the network switch circuitries $320_1$ and $320_2$, and the horizontal communication lane $322_1$. The vertical communication lane $324_5$ is connected to an ingress port of the crossbar circuitry $330_1$. Accordingly, the interleaving switch circuitry $310_1$ is connected to the crossbar circuitry $330_1$ via the vertical communication lanes $324_1$ and $324_5$, and the network switch circuitries $320_1$ and $320_2$, and the horizontal communication lane $322_1$.

An egress port of the interleaving switch circuitry $310_1$ is connected to the vertical communication lane $324_2$, which is connected the horizontal communication lane $322_2$ via the network switch circuitries $320_3$ and $320_4$. Further, the vertical communication lane $324_2$ is connected to the vertical communication lane $324_6$ via the network switch circuitries $320_3$ and $320_4$, and the horizontal communication lane $322_2$. The vertical communication lane $324_6$ is connected an ingress port of the crossbar circuitry $330_2$. Accordingly, the interleaving switch circuitry $310_1$ is connected to the crossbar circuitry $330_2$ via the vertical communication lanes $324_2$ and $324_6$, the network switch circuitries $320_3$ and $320_4$, and the horizontal communication lane $322_2$.

An egress port of the interleaving switch circuitry $310_1$ is connected to the vertical communication lane $324_3$, which is connected the horizontal communication lane $322_3$ via a port of the network switch circuitry $320_5$. Further, the vertical communication lane $324_3$ is connected to the vertical communication lane $324_7$ via a port of the network switch circuitries $320_5$ and $320_6$, and the horizontal communication lane $322_3$. The vertical communication lane $324_7$ is connected an ingress port of the crossbar circuitry $330_3$. Accordingly, the interleaving switch circuitry $310_1$ is connected to the crossbar circuitry $330_3$ via the vertical communication lanes $324_3$ and $324_7$, the network switch circuitries $320_5$ and $320_6$, and the horizontal communication lane $322_3$.

An egress port of the interleaving switch circuitry $310_4$ is connected to the vertical communication lane $324_4$, which is connected the horizontal communication lane $322_4$ via a port the network switch circuitry $320_7$. Further, the vertical communication lane $324_4$ is connected to the vertical communication lane $324_8$ via a port the network switch circuitries $320_7$ and $320_8$, and the horizontal communication lane $322_4$. The vertical communication lane $324_8$ is connected an ingress port of the crossbar circuitry $330_4$. Accordingly, the interleaving switch circuitry $310_1$ is connected to the crossbar circuitry $330_4$ via the vertical communication lanes $324_4$ and $324_8$, the network switch circuitries $320_7$ and $320_8$, and the horizontal communication lane $322_4$.

The interleaving switch circuitry $310_1$ is connected to other ones of the crossbar circuitries 330 via other combinations of vertical communication lanes 324, horizontal communication lanes 322, and network switch circuitries 320. Further, the interleaving switch circuitries $310_2$-$310_8$ are connected to the crossbar circuitries 330 via combinations of the vertical communication lanes 324, the horizontal communication lanes 322, and the network switch circuitries 320. In one or more examples, each of the interleaving switch circuitries $310_2$-$310_8$ is connected to respective ones of the crossbar circuitries 330 via unique combinations of the vertical communication lanes 324, the horizontal communication lanes 322, and the network switch circuitries 320.

Each crossbar circuitry 330 is associated with a different memory address range. Accordingly, each horizontal communication lane 322, vertical communication lane 324 and network switch circuitry 320 connected to a crossbar circuitry 330, is associated with the memory address range of the crossbar circuitry 330. In one example, one or more horizontal communication lanes 322, one or more vertical communication lanes 324 and/or one or more network switch circuitries 320 are connected to multiple crossbar circuitries 330. In such an example, such horizontal communication lanes 322, vertical communication lanes 324 and/or network switch circuitries 320 are associated with multiple memory address ranges.

In one example, an interleaving switch circuitry 310 routes a received memory command to one of the vertical communication lanes 324 based on the memory address of the memory command. The interleaving switch circuitry 310 determines which of the vertical communication lanes 324 is associated with the memory address and routes the memory command to that vertical communication lane 324. The memory command is received by a port of a network switch circuitry 320 connected to the vertical communication lane 324 and routes the memory command to another network switch circuitry 320 along a respective horizontal communication channel 322 based on the memory address. The network switch circuitry 320 routes the memory command to a vertical communication lane 324 or to another network switch circuitry 320 connected to the same horizontal communication lane 322 based on the memory address. The routing process is repeated until the memory command is output to the target crossbar circuitry 330. The target crossbar circuitry 330 outputs the memory command to the memory device 340 via a respective channel. Data from the memory device 340 is routed back to the requester device by reversing the above routing process.

FIG. 4 illustrates a block diagram of interconnect circuitry 400, according to one or more examples. The interconnect circuitry 400 includes interleaving switch circuitries 410, network switch circuitries 420, and crossbar circuitries 430. The interleaving switch circuitries 410 is configured similar to that of the interleaving switch circuitries 210 of FIG. 2, network switch circuitries 420 are configured similar to that of the network switch circuitries 220 of FIG. 2, and crossbar circuitries 430 are configured similar to that of crossbar circuitries 230 of FIG. 2. In one example, each interleaving switch circuitry 410 includes four ingress ports and four egress ports. In other examples, the number of input and egress ports may differ. Further, each crossbar circuitry 430 has three ingress ports and three egress ports. In other examples, the number of input and egress ports may differ.

The interconnect circuitry 400 is configured similar to that of the interconnect circuitry 300 in that the interleaving switch circuitries 410 are connected to the crossbar circuitries 430 via the vertical communication lanes 424, the horizontal communication lanes 422, and the network switch circuitries 420 as the interleaving switch circuitries 310 are connected to the crossbar circuitries 330 via the vertical communication lanes 324, the horizontal communication lanes 322, and the network switch circuitries 320.

As is described above with regard to FIG. 3, the network switch circuitries 420 interconnect the vertical communication lanes 424 and the horizontal communication lanes 422. Each horizontal communication lane 422 is connected to multiple crossbar circuitries 430 via network switch circuitries 420 and vertical communication lanes 424. The interconnections between each of the horizontal communication lanes 422 and the vertical communication lanes 424 using the network switch circuitries 420 form connections between the interleaving switch circuitries 310 and the crossbar circuitries 430. For example, each interleaving switch circuitry 410 is connected to each of the crossbar circuitries 430 via different combinations of the horizontal communication lanes 422 and the vertical communication lanes 424 using the network switch circuitries 420.

Further, as is described above with regard to FIG. 3, each crossbar circuitry 430 is associated with a different memory address range. Accordingly, each horizontal communication lane 422, vertical communication lane 424 and network switch circuitry 420 connected to a crossbar circuitry 430, is associated with the memory address range of the crossbar circuitry 430. In one example, one or more horizontal communication lanes 422, one or more vertical communication lanes 424 and/or one or more network switch circuitries 420 are connected to multiple crossbar circuitries 430. In such an example, such horizontal communication lanes 422, vertical communication lanes 424 and/or network switch circuitries 420 are associated with multiple memory address ranges.

FIG. 3 and FIG. 4 illustrate two example configurations of interconnect circuitry (e.g., the interconnect circuitry 300 and 400). In other examples, an interconnect connect circuitry may be configured in other ways to include more or less interleaving switch circuitries, network switch circuitries, vertical communication lanes, horizontal communication lanes, and/or crossbar circuitries.

Figure 5:
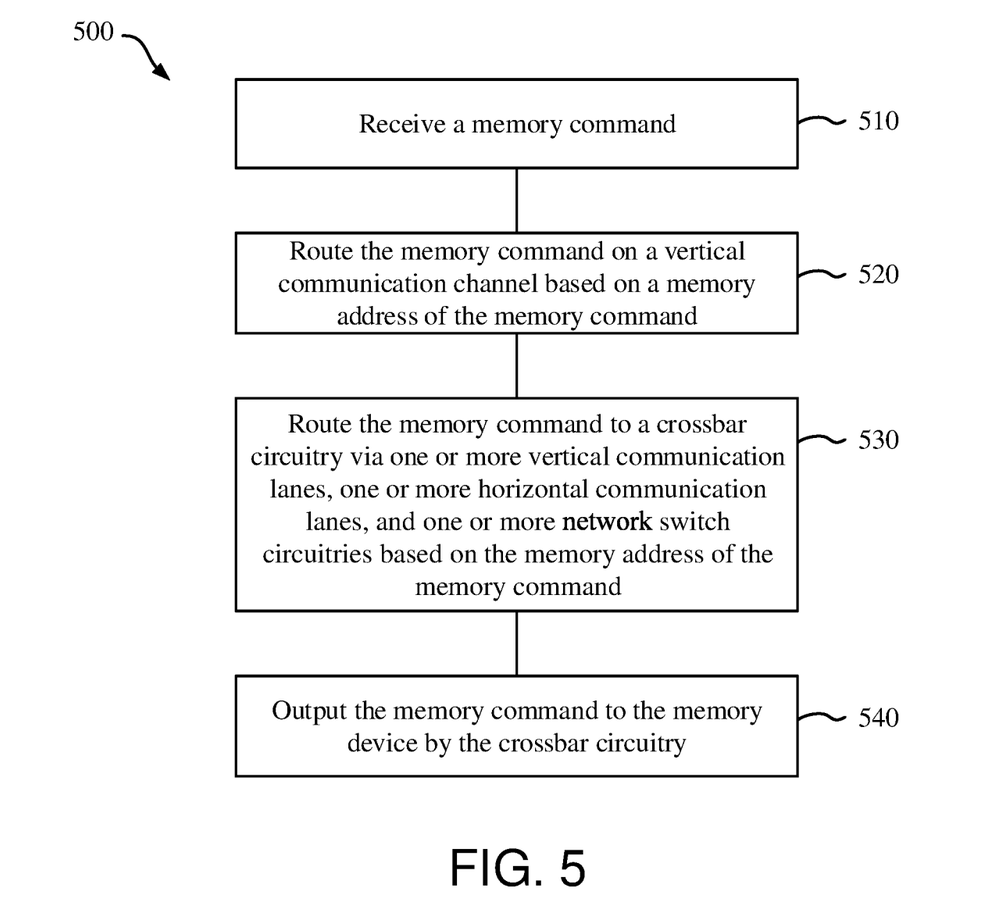
FIG. 5 illustrates a flowchart of a method of routing a memory command within interconnect circuitry.

FIG. 5 illustrates a flowchart of a method 500 for routing memory commands in interconnect circuitry, according to one or more examples. The method 500 is performed by interconnect circuitry (e.g., the interconnect circuitry 116 of FIG. 2, the interconnect circuitry 300 of FIG. 3, or the interconnect circuitry 400 of FIG. 4). In the following, the method 500 is described with reference to FIG. 3.

At 510 of the method 500, a memory command is received. The memory command is received by interleaving switch circuitry of the interconnect circuitry. In one example, the memory command is received by the interleaving switch circuitry 310 of the interconnect circuitry 300.

At 520 of the method 500, the memory command is routed on a vertical communication channel based on a memory address of the memory command. In one example, the interleaving switch circuitry $310_1$ outputs the memory command on one of the vertical communication lanes $324_1$-$324_4$ based on the memory address of the memory command. For example, the interleaving switch circuitry $310_1$ determines the memory address from the memory command or identifies the memory address based on an identifier associated with the memory command. The interleaving switch circuitry $310_1$ selects one of the vertical communication lanes $324_1$-$324_4$ to output the memory command based on the memory address. For example, each of the vertical communication lanes $324_1$-$324_4$ is associated with a different range or ranges of memory addresses. The ranges of the memory addresses correspond to the interleaving applied to the memory devices (e.g., the memory devices 340) connected to the interconnect circuitry 300. In one example, the interleaving switch circuitry $310_1$ selects the vertical communication lane $324_1$ based on a comparison of memory address to the ranges of the memory addresses, and outputs the memory command on the vertical communication lane $324_1$ to route the memory address along the vertical communication lane $324_1$.

At 530 of the method 500, the memory command is routed to a crossbar circuitry via one or more vertical communication lanes, one or more horizontal communication lanes, and one or more network switch circuitries based on the memory address of the memory command. For example, the memory command is routed to the crossbar circuitry $330_1$ via the vertical communication lanes $324_1$ and $324_5$, the horizontal communication lane $322_1$, and the network switch circuitries $320_1$ and $320_2$. The network switch circuitry $320_2$ receives the memory command via the vertical communication lane $324_1$. The network switch circuitry $320_2$ determines that memory command is to be routed to the network switch circuitry $320_1$ via the horizontal communication lane $322_1$. The network switch circuitry $320_2$ determines how to route the memory command based on an address of the memory command and/or an identifier associated with the memory command. The network switch circuitry $320_2$ determines that the network switch circuitry $320_1$ is the target network switch circuitry $320_1$ as the network switch circuitry $320_1$ is associated with the memory address range associated with the crossbar circuitry $330_1$, which corresponds to the memory address of the memory command. In one example, each of the network switch circuitries 320 is associated with a range or ranges of memory addresses. In such an example, the network switch circuitry $320_2$ compares the memory address or identifier of the memory command with the range associated with the network switch circuitry $320_1$ and the next network switch circuitry 320 connected to the horizontal communication lane $322_1$. The network switch circuitry $320_2$ determines that the network switch circuitry $320_1$ is the target network switch circuitry $320_1$ based on the memory address or identifier comparison.

The network switch circuitry $320_1$ receives the memory command (and identifier when provided) and outputs the memory command to the crossbar circuitry $330_1$.

At 540 of the method 500, the memory command is output to the memory device by the crossbar circuitry. For example, the crossbar circuitry $330_1$ outputs the memory command to the memory device 340 via a memory channel. The crossbar circuitry $330_1$ determines (or identifies) which of the memory channels is associated with a memory device that is associated with a memory address range including the memory address of the memory commands, and outputs the memory command on the determined memory channel.

In one example, two or more of the interleaving switch circuitries 310 receive and/or route a memory command during overlapping periods. Further, two or more network switch circuitries 320 receive and/or route a memory command during overlapping periods. Each of the interleaving switch circuitries 310 route memory commands as is described above with regard to 520 of the method 500. Further, each of the network switch circuitries 320 route memory commands as is described above with regard to 530 of the method 500. Each of the crossbar circuitries 330 route memory commands as is described above with regard to 540 of the method 500.

While the foregoing is directed to specific examples, other and further examples may be devised without departing from the basic scope thereof, and the scope thereof is determined by the claims that follow.

What is claimed is:

1. An interconnect circuitry of an integrated circuit (IC) device, the interconnect circuitry comprising:
   interleaving switch circuitries coupled to requester devices of the IC device, a first interleaving switch circuitry of the interleaving switch circuitries comprises first ports and is configured to:
   receive a first memory command; and output the first memory command via first communication lanes disposed within the IC device and connected to a first port of the first ports based on a memory address of the first memory command;

network switch circuitries connected to the interleaving switch circuitries, a first network switch circuitry of the network switch circuitries connected to a first communication lane and second communication lane of the first communication lanes and configured to route the first memory command from the first communication lane to the second communication lane based on the memory address, wherein the first communication lane is disposed in a first direction and the second communication lane is disposed in a second direction different than the first direction; and crossbar circuitries coupled to memory devices external to the IC device, a first crossbar circuitry of the crossbar circuitries configured to receive the first memory command from the first communication lanes and output the first memory command to a first memory device of the memory devices associated with the memory address, wherein a number of the first ports corresponds to an interleaving order of the memory devices, and wherein the second communication lane is connected to two or more of the crossbar circuitries.

2. The interconnect circuitry of claim 1, wherein the first communication lanes are associated with a first memory address range of a plurality of memory address ranges, and wherein the first interleaving switch circuitry is further configured to output the first memory command via the first communication lanes based on a comparison of the memory address with the plurality of memory address ranges.

3. The interconnect circuitry of claim 1, wherein the first communication lanes are interconnected via one or more of the network switch circuitries.

4. The interconnect circuitry of claim 1, wherein the first network switch circuitry is configured to output the first memory command to a second network switch circuitry of the network switch circuitries based on the memory address, wherein the second network switch circuitry is associated with a memory address range including the memory address.

5. The interconnect circuitry of claim 4, wherein the first network switch circuitry is connected to the first interleaving switch circuitry via the first communication lane of the first communication lanes, the first network switch circuitry is connected to the second network switch circuitry via the second communication lane of the first communication lanes, and the second network switch circuitry is connected to the first crossbar circuitry via a third communication lane of the first communication lanes.

6. The interconnect circuitry of claim 1, wherein the memory devices are interleaved with each other, and each of the crossbar circuitries is associated a respective memory address range of the interleaved memory devices.

7. The interconnect circuitry of claim 1, wherein a second interleaving switch circuitry of the interleaving switch circuitries is configured to route a second memory command to the first crossbar circuitry via second communication lanes having a second network switch circuitry of the network switch circuitries based on a memory address of the second memory command, wherein the memory address of the first memory command and the memory address of the second memory command are within a first memory address range used to interleave the memory devices.

8. An integrated circuit (IC) device comprising:
a requester circuit element configured to output a first memory command; and
interconnect circuitry connected to the requester circuit element and comprising:
a first interleaving switch circuitry of interleaving switch circuitries comprising first ports and configured to:
receive the first memory command; and
output the first memory command via first communication lanes connected to a first port of the first ports based on a memory address of the first memory command;
network switch circuitries connected to the interleaving switch circuitries, a first network switch circuitry of the network switch circuitries connected to a first communication lane and second communication lane of the first communication lanes and configured to route the first memory command from the first communication lane to the second communication lane based on the memory address, wherein the first communication lane is disposed in a first direction and the second communication lane is disposed in a second direction different than the first direction; and
crossbar circuitries coupled to memory devices external to the IC device, a first crossbar circuitry of the crossbar circuitries configured to receive the first memory command from the first communication lanes and output the first memory command to a first memory device of the memory devices associated with the memory address, wherein a number of the first ports corresponds to an interleaving order of the memory devices, and wherein the second communication lane is connected to two or more of the crossbar circuitries.

9. The IC device of claim 8, wherein the first communication lanes are associated with a first memory address range of a plurality of memory address ranges, and wherein the first interleaving switch circuitry is further configured to output the first memory command via the first communication lanes based on a comparison of the memory address with the plurality of memory address ranges.

10. The IC device of claim 8, wherein the first communication lanes are interconnected via one or more of the network switch circuitries.

11. The IC device of claim 8, wherein the first network switch circuitry is configured to output the first memory command to a second network switch circuitry of the network switch circuitries based on the memory address, wherein the second network switch circuitry is associated with a memory address range including the memory address.

12. The IC device of claim 11, wherein the first network switch circuitry is connected to the first interleaving switch circuitry via the first communication lane of the first communication lanes, the first network switch circuitry is connected to the second network switch circuitry via the second communication lane of the first communication lanes, and the second network switch circuitry is connected to the first crossbar circuitry via a third communication lane of the first communication lanes.

13. The IC device of claim 8, wherein the memory devices are interleaved with each other, and each of the crossbar circuitries is associated a respective memory address range of the interleaved memory devices.

14. The IC device of claim 8, wherein a second interleaving switch circuitry of the interleaving switch circuitries is configured to route a second memory command to the first crossbar circuitry via second communication lanes having a second network switch circuitry of the network switch circuitries based on a memory address of the second memory command, wherein the memory address of the first memory command and the memory address of the second memory command are within a first memory address range used to interleave the memory devices.

15. A method comprising:
    receiving a first memory command at a first interleaving switch circuitry of interleaving switch circuitries of interconnect circuitry;
    outputting, via a first port of first ports of the first interleaving switch circuitry, the first memory command via a first communication lane of first communication lanes of the interconnect circuitry based on a memory address of the first memory command;
    routing, via a first network switch circuitry of network switch circuitries of the interconnect circuitry, the first memory command from the first communication lane to a second communication lane of the first communication lanes based on the memory address, the first network switch circuitry connected to the first communication lanes, wherein the first communication lane is disposed in a first direction and the second communication lane is disposed in a second direction different than the first direction; and
    outputting, via a first crossbar circuitry of crossbar circuitries of the interconnect circuitry, the first memory command to a first memory device of memory devices associated with the memory address, the first crossbar circuitry connected to the first communication lanes, wherein a number of the first ports corresponds to an interleaving order of the memory devices, and wherein the second communication lane is connected to two or more of the crossbar circuitries.

16. The method of claim 15 further comprising determining, via the first interleaving switch circuitry, to output the first memory command via the first communication lanes based on a comparison of the memory address with a first memory address range of a plurality of memory address ranges, wherein the first memory address range is associated with the first communication lanes.

17. The method of claim 15, wherein the first communication lanes are interconnected via one or more of the network switch circuitries.

18. The method of claim 15 further comprising outputting, via the first network switch circuitry, the first memory command to a second network switch circuitry of the network switch circuitries based on the memory address, wherein the second network switch circuitry is associated with a memory address range including the memory address.

19. The method of claim 18, wherein the first network switch circuitry is connected to the first interleaving switch circuitry via the first communication lane of the first communication lanes, the first network switch circuitry is connected to the second network switch circuitry via the a second communication lane of the first communication lanes, and the second network switch circuitry is connected to the first crossbar circuitry via a third communication lane of the first communication lanes.

20. The method of claim 15, wherein the memory devices are interleaved with each other, and each of the crossbar circuitries is associated a respective memory address range of the interleaved memory devices.

* * * * *